US007899336B2

(12) United States Patent
Taniguchi et al.

(10) Patent No.: US 7,899,336 B2
(45) Date of Patent: Mar. 1, 2011

(54) OPTICAL COMMUNICATIONS DEVICE AND OPTICAL COMMUNICATIONS SYSTEM

(75) Inventors: Yoshihiko Taniguchi, Koto-ku (JP); Hiryoya Ohnishi, Koto-ku (JP)

(73) Assignee: Fujikura Ltd., Tokyo (JP)

( * ) Notice: Subject to any disclaimer, the term of this patent is extended or adjusted under 35 U.S.C. 154(b) by 497 days.

(21) Appl. No.: 11/570,203

(22) PCT Filed: Jun. 10, 2005

(86) PCT No.: PCT/JP2005/010676

§ 371 (c)(1), (2), (4) Date: Dec. 7, 2006

(87) PCT Pub. No.: WO2005/122444

PCT Pub. Date: Dec. 22, 2005

(65) Prior Publication Data

US 2007/0177881 A1 Aug. 2, 2007

(30) Foreign Application Priority Data

Jun. 10, 2004 (JP) ................................ 2004-172734

(51) Int. Cl.
*H04B 10/04* (2006.01)
*H04B 10/12* (2006.01)

(52) U.S. Cl. ........................................ 398/194; 398/192

(58) Field of Classification Search .................. 398/192, 398/194

See application file for complete search history.

(56) References Cited

U.S. PATENT DOCUMENTS

| | | | | |
|---|---|---|---|---|
| 2002/0018492 | A1 * | 2/2002 | Sakai et al. | 370/512 |
| 2004/0165598 | A1 * | 8/2004 | Shrimali et al. | 370/395.42 |
| 2004/0240885 | A1 * | 12/2004 | Naoe et al. | 398/118 |
| 2005/0138670 | A1 * | 6/2005 | Ploumen | 725/118 |

FOREIGN PATENT DOCUMENTS

| | | | |
|---|---|---|---|
| JP | 04-291856 | A | 10/1992 |
| JP | 6-029925 | A | 2/1994 |
| JP | 11-177624 | A | 7/1999 |
| JP | 200-049715 | A | 2/2000 |
| JP | 2001-244528 | A | 9/2001 |
| JP | 2002-084247 | A | 3/2002 |
| JP | 2004-096737 | A | 3/2004 |
| JP | 2004-120751 | A | 4/2004 |

OTHER PUBLICATIONS

English translation of the Japanese version of a Chinese Office Action dated Nov. 6, 2009 issued in corresponding Chinese Application No. 200580019094.6.

* cited by examiner

*Primary Examiner* — Nathan M Curs
(74) *Attorney, Agent, or Firm* — Sughrue Mion, PLLC

(57) ABSTRACT

In an optical communications device that generates picture optical signals and optical signals for data communication by wavelength division multiplexing, it is carried out to alter a signal pattern inserted between packet signals of the optical signals for data communication so that a frequency component of a modulation waveform of the signal pattern disperses. The signal pattern is generated by inputting outputs of a counter for counting up a sign bit into a coder adopting a designated coding method.

4 Claims, 5 Drawing Sheets

1001110100
0111010100
1011010100
1100011011
0010101011
1010010100
0110011011
0001110100
1110010100
1001011011
0101010100
1101001011
0011010100
1011001011
0111000100
0101110100

OPTICAL COMMUNICATIONS DEVICE AND OPTICAL COMMUNICATIONS SYSTEM

This application is the National Stage Entry of PCT Application No. PCT/JP2005/010676 filed Jun. 10, 2005, and claims priority from Japanese Patent Application No. 2004-172734 filed Jun. 10, 2004, which applications are incorporated herein by reference.

TECHNICAL FIELD

The present invention relates to an optical communications device that multiplexes optical signals for picture communication and optical signals for data communication by WDM method and an optical communications system having the above optical communications device.

BACKGROUND ART

Japanese Patent Laid-Open Publication No. 2001-244528 discloses an optical fiber communication that combines optical signals for data communication on, for instance, Internet, with optical signals for picture communication on, for instance, CATV (Cable Television), by WDM method (Wavelength-Division Multiplexing) for the purpose of effective use of an optical fiber in FTTH (Fiber To The Home) and others.

Data communication on Internet is commonly done with the use of optical signals on direct digital modulation (e.g. "1" for light-on and "0" for light-off (vice versa)) at a data rate such as 622 Mbps and 1.25 Gbps. The optical signals for data communication are formed by successive time-series data composed of packet signals representing communication data such as telegraphic message and idle signals embedded in between the packet signals. That is, as shown in FIG. 1, the communication data such as telegraphic message is transmitted in the form of packets (i.e. packet signals P1, P2, . . . ) intermittently. However, since respective intervals between the packet signals are filled up with idle signals A101, A102, A103, . . . representing "absence of a packet signal", the optical signals for data communication are transmitted continuously.

An idle signal is commonly provided with a cyclic signal pattern. For instance, according to 1000BASE.X (so-called "gigabit Ethernet" (registered trademark)) defined in ISO/IEC8802.3, the idle signal has a cycle of 20 bits represented as [00111110101001000101].

FIG. 2 shows this idle signal in the form of a modulation waveform of optical signals.

In Internet applications, such as website browsing, download of files and e-mail receiving, a downward communication request from a provider to a user discretely occurs in temporal direction. Consequently, in data communication on Internet, much of communication time is occupied with idle signals. Note here that in the data communication on Internet a direction from a provider's side to a user's side will be referred to as "downward direction" and additionally, the reverse direction from a user's side to a provider's side will be referred to as "upward direction".

Meanwhile, in picture communication on CATV, it is necessary to transmit picture signals of about 100 channels in their multiplexed condition. The current transmission method in popular use is represented by WDM method where picture signals in multichannel are divided with respect to each specified frequency. This is a method where picture signals at individual channels are modulated in analog and thereupon, the modulated picture signals of each channel are arranged with respect to each constant frequency range in sequence. Of course, frequency components of the picture signals at a certain channel concentrate on a frequency range allocated to the same channel.

DISCLOSURE OF THE INVENTION

In the above-mentioned optical fiber communications by WDM method, in order to improve convenience in processing (amplifying, branching, etc.) multiplexed optical signals in block, it is frequently carried out to allow respective wavelengths of optical signals, which are transmitted in a same communication direction, to come close to each other. When transmitting the optical signals having adjacent wavelengths through a same optical fiber, a phenomenon that part of energy of optical signals having a short wavelength makes the transition to optical signals having a long wavelength, occurs due to the influence of the induced Raman scattering, which is one of nonlinear optical effects of the optical fiber. The induced Raman scattering is a scattering caused by an interaction between incident signal light and an optical phonon produced by the incident signal light. Thus, if the induced Raman scattering occurs, then energy of optical signals having a short wavelength amplifies optical signals having a long wavelength adjacent to the short wavelength.

The picture communication commonly adopts optical signals having a wavelength of 1.55 μm, while the data communication adopts optical signals having a wavelength of 1.49 μm. Therefore, when the Raman scattering occurs, the energy of the optical signals for data communication amplifies the optical signals for picture communication.

Such an amplification causes noise for optical signals having a long wavelength, in this case, optical signals for picture communication. Particularly, if the proportion of idle signals to optical signals for data communication gets longer temporarily, the frequency component of a modulation waveform of the relevant optical signals comes closer to concentrating on a specific frequency. Because the idle signal is constructed in the form of a cyclic signal pattern having the cycle of short bit-string, as described above. Whereat, the influence of the Raman scattering on picture signals of a channel including the relevant specified frequency becomes remarkable, so that the quality of picture signals deteriorates.

We now explain this problem more closely.

Data communication on Internet is commonly carried out between an apparatus on a provider's side and a device on a user's side interactively. On the other hand, picture communication on CATV is carried out from a provider's side to a user's side in one direction. Accordingly, two signals in the downward direction and one signal in the upward direction, that is, three signals in total are transmitted in an identical optical fiber. Then, the above problem occurs in between the two signals in the downward direction saliently, that is, a data signal for Internet and others and a picture signal for CATV and others.

In data communication on Internet, since direct digital modulation is applied to optical signals as mentioned above, the same signals come under the influence of the Raman scattering only at the lighting of the optical signals for data communication. In short, intensity-modulation waveforms of the optical signals for data communication are superimposed on picture signals at a certain rate. Although the degree of influence of the Raman scattering depends on a variety of parameters besides a difference in wavelength, for example, fiber's length, temperature, polarization of light and so on, the occurrence of the Raman scattering is unavoidable.

In data communication on Internet, the contents of communication data differ from each other on a case-by-case basis in general. Therefore, since the bit-strings of packet signals forming the optical signals for communication data differ from each other with respect to each communication data, the frequency components of modulation waveforms of the packet signals disperse to some degree in the process of data communication. Meanwhile, since each of the idle signals as the other component forming the relevant optical signals is constructed with a cyclic signal pattern having the cycle of a short bit string, the frequency components of modulation waveforms of the relevant idle signals concentrate on a specific frequency.

Supposing the waveform of the idle signals as a square waves as shown in FIG. 2, we analyze their frequency components. The analysis result is shown in FIG. 3. Here the data rate of 1000BASE.X defined in ISO/IEC8802.3 mentioned above is 1.25 Gbps and additionally, 20 bit-string of 1.25 Gbps is repeated at a frequency of 62.5 MHz. Thus, as obvious from FIG. 3, the frequency spectrum of the idle signals shown in FIG. 2 is intensified at frequencies of integer multiples of the fundamental frequency: 6.25 MHz. In other words, the frequency components of the modulation waveform of the idle signals concentrate on frequencies of integer multiples of the fundamental frequency.

Thus, if the data communication on Internet multiplexed by WDM method in an optical fiber is 1000BASE.X defined in ISO/IEC8802.3, the influence of the induced Raman scattering on optical signals for picture communication on CATV, also concentrates on frequencies of FIG. 3 whose spectral intensities are intensive.

Since respective channels of picture signals on CATV concentrate on a specified range of frequencies, the influence of the induced Raman scattering by 1000BASE.X optical signals becomes remarkable in each channel of the picture signals on CATV, thereby causing a possibility that the picture signal of the channel deteriorates.

Considering the above-mentioned problems in prior art, an object of the present invention is to provide an optical communications device and an optical communication system, both of which can reduce a baneful influence of the induced Raman scattering of optical signals for data communication on optical signals for picture communication in an optical fiber communication by WDM method, whereby the quality of picture optical communication can be improved in a low price.

In order to accomplish the above object, according to a first aspect of the present invention, there is provided an optical communications device for generating optical signals for data communication, comprising: a packet-signal generator that generates packet signals in the optical signals for data communication; an idle-signal generator that generates an idle signal to be inserted between the packet signals generated by the packet-signal generator; and a coder that disperses a frequency component of a modulation waveform of a signal pattern of the idle signal generated by the idle-signal generator.

Additionally, according to a second aspect of the present invention, there is provided an optical communications device for generating optical signals for data communication, comprising: a packet-signal generator that generates packet signals in the optical signals for data communication; a dummy packet-signal generator that generates a dummy packet signal to be inserted between the packet signals generated by the packet-signal generator; an idle-signal generator that generates an idle signal to be inserted between the packet signal generated by the packet-signal generator and the dummy packet signal generated by the dummy packet-signal generator; and a coder that disperses a frequency component of a modulation waveform of a signal pattern of the dummy packet-signal generated by the dummy packet-signal generator.

BEST MODE FOR CARRYING OUT THE INVENTION

Embodiments of an optical communications device and an optical communications system of the present invention will be described with reference to drawings. Note that the optical communications device of the present invention is applied to a data communication transmitter in the following embodiments.

$1^{st}$. Embodiment

The first embodiment is characterized by an alteration of the signal patterns of idle signals in optical signals for data communication. By this alteration, a frequency component of a modulation waveform of the relevant optical signals is dispersed to avoid a concentration on a specific frequency.

Figure 4:
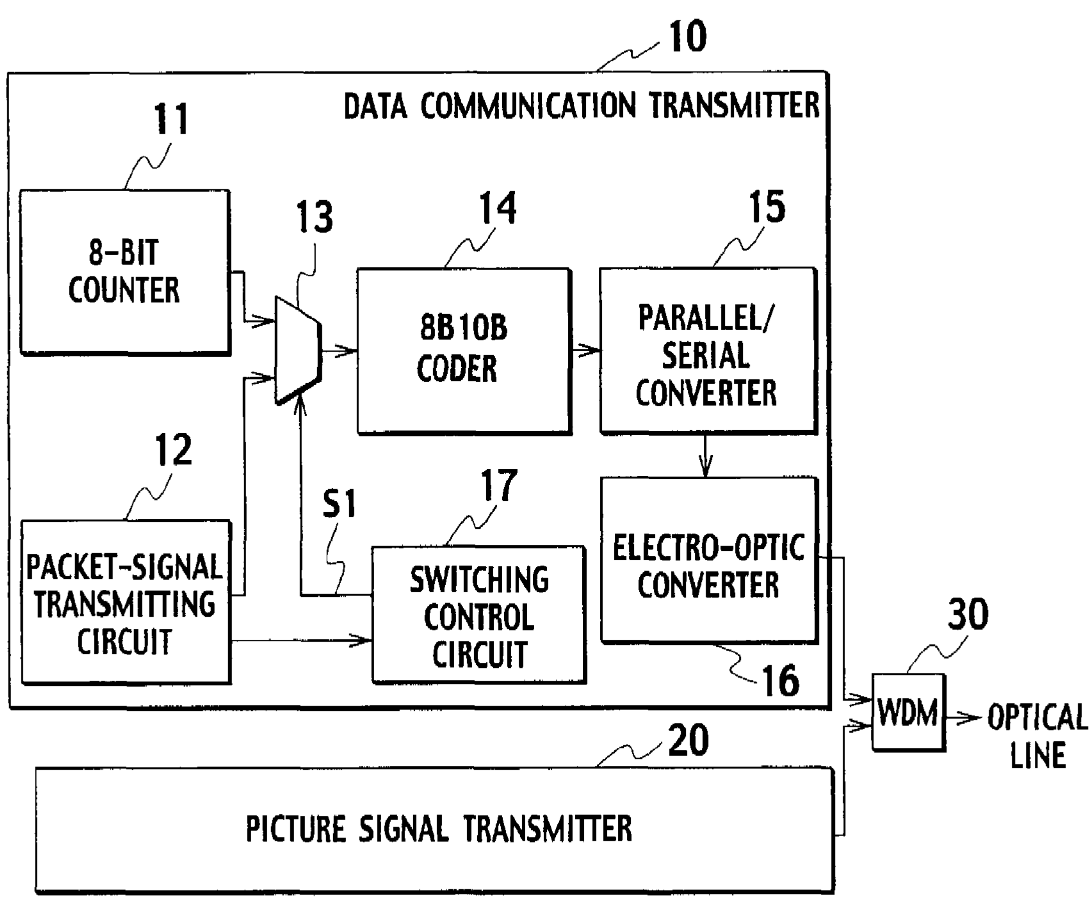
FIG. 4 is a block diagram showing a constitution of an optical communications system having a data communication transmitter in accordance with a first embodiment.

FIG. 4 is a block diagram showing a constitution of an optical communications system having an optical communications device in accordance with the first embodiment of the present invention.

This optical communications system comprises a data communication transmitter transmitting optical signals (e.g. wave length of 1.49 μm) for data communication such as internet, a picture signal transmitter (picture signal generator) 20 transmitting optical signals (e.g. wave length of 1.55 μm) for picture communication such as CATV, and a WDM unit 30 which produces optical signals where respective optical signals transmitted from the data communication transmitter 10 and the picture signal transmitter 20 are superimposed on each other by WDM method and which transmits the optical signals to an optical line composed of an optical fiber.

The data communication transmitter 10 includes an 8-bit counter (idle signal generator) 11, a packet signal transmitting circuit (packet-signal generator) 12, a selector 13 and a switching control circuit 17. The 8-bit counter 11 is formed by a circuit that outputs sixteen 8-bit codes stretching from “0x00” to “0x0F” in hexadecimal form cyclically, while the packet signal transmitting circuit 12 is formed by a circuit that outputs transmission data in the form of a packet signal. The selector 13 selects either the 8-bit counter 11 or the packet signal transmitting circuit 12. The switching control circuit 17 outputs a switching control signal S1.

Additionally, to an output side of the selector 13, there are sequentially connected an 8B10B coder 14, a parallel/serial converter 15 and an electro-optic converter 16, so that optical signals outputted from the electro-optic converter 16 are inputted to the WDM unit 30. Here, the 8B10B coder 14 is formed by a circuit that realizes 8B10B code rule being an optical-signal generation code rule defined by ISO/IEC8802.3, putting data of 8 bits into code for transmitting in the form of 10 bits. The parallel/serial converter 15 is formed by a circuit that converts parallel data outputted from the 8B10B coder 14 into serial data. The electro-optic converter 16 is formed by light emission diodes etc. and converts the serial data outputted from the parallel/serial converter 15 into optical signals.

According to the data communication transmitter 10 constructed above, the switching control circuit 17 receives a signal from the packet signal transmitting circuit 12, further judges the presence or absence of a packet signal transmitted from the packet signal transmitting circuit 12 and outputs a switching control signal S1 to allow the selector 13 to select an output from the packet signal transmitting circuit 12 while the packet signal is transmitted from the packet signal transmitting circuit 12. On the other hand, the switching control circuit 17 outputs a switching control signal S1 to allow the selector 13 to select an output from the 8B10B coder 14 while the packet signal is not transmitted from the packet signal transmitting circuit 12.

Consequently, during the absence of a packet signal, sixteen 8-bit codes, that is, "0x00", "0x01", "0x02", . . . and "0x0F" in hexadecimal form are sequentially outputted from the 8-bit counter 11 to an 8-bit input node of the 8B10B coder 14 through the selector 13. Thus, as a signal pattern to be inserted between the packet signals, a signal pattern having a cycle of 160 bit-string shown in FIG. 5 is outputted from the 8B10B coder 14.

Figure 3:
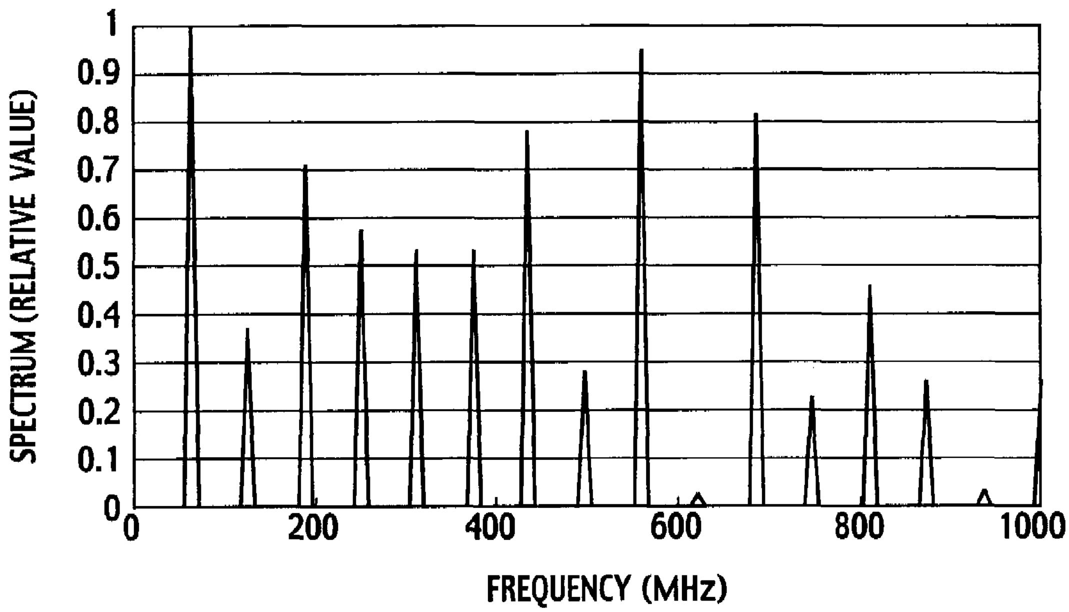
FIG. 3 is a graph showing a frequency spectrum of the idle signals shown in FIG. 2.
Figures 5, 6:
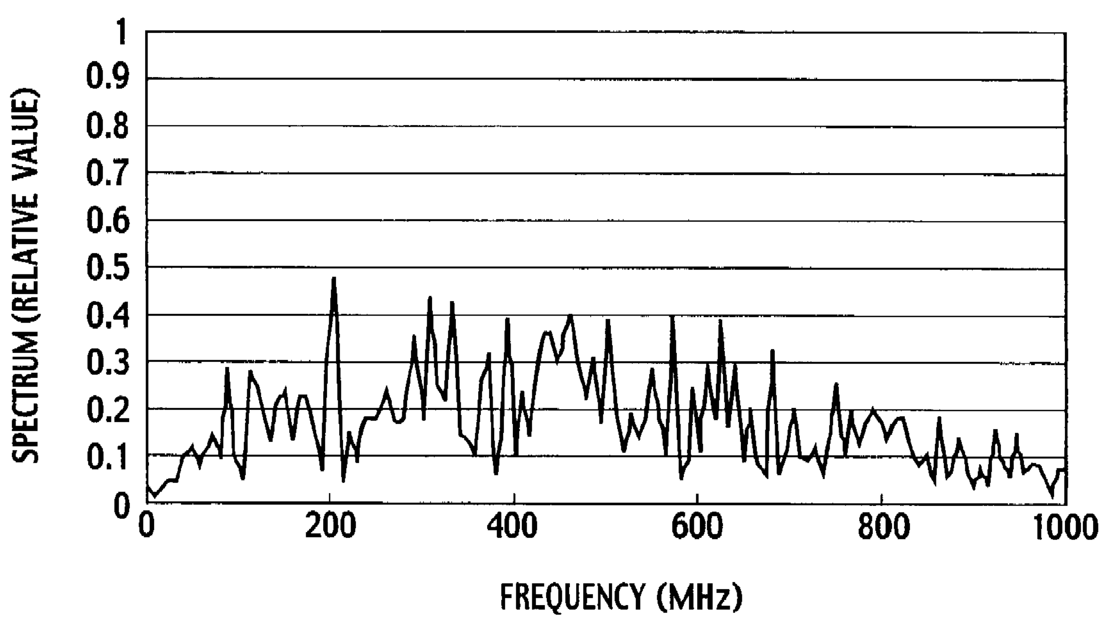
FIG. 5 is a view showing one example of the signal pattern of the idle signals used in the first embodiment.
FIG. 6 is a graph showing a frequency spectrum of the idle signals shown in FIG. 5.

FIG. 6 shows a frequency component of the idle signals constructed in the cyclic signal pattern having this cycle of 160 bit-string. As obvious from the same figure, the frequency component is remarkably dispersed without concentrating on a specific frequency in comparison with the idle signals constructed in the conventional cyclic signal pattern having a cycle of 20 bit-string shown in FIG. 3.

Figure 7:
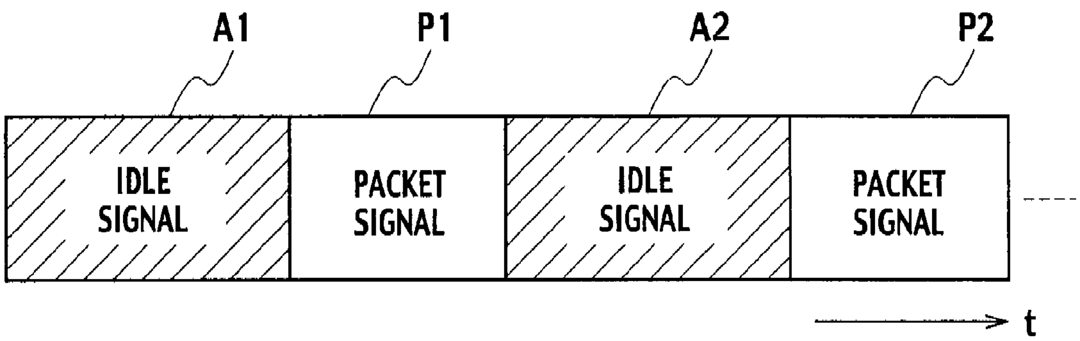
FIG. 7 is a pattern diagram showing the contents of optical signals outputted from the data communication transmitter in accordance with the first embodiment.

Accordingly, as shown in FIG. 7, the optical signals for data communication transmitted from the data communication transmitter 10 have a format where idle signals A1, A2, . . . repeating the cyclic pattern having the above cycle of 160 bit-string are embedded throughout intervals having no place for the packet signals P1, P2, . . . .

Consequently, when the optical signals for data communication from the data communication transmitter 10 are supplied into the optical fiber through the WDM unit 30, a baneful influence of the induced Raman scattering by the relevant optical signals for data communication on optical signals for picture communication transmitted from the picture signal transmitter 20 is reduced to allow the quality of the optical signals for picture communication to be maintained in good condition. Additionally, since the present invention can be embodied by such a very simple method, the effect of the invention can be accomplished at a low price.

Note that this embodiment is mainly directed to disperse a frequency component of a modulated waveform of the optical signals in the data communication and therefore, the signal pattern of idle signals to be altered for this dispersion is not limited to the pattern shown in FIG. 5 only.

$2^{nd}$. Embodiment

The second embodiment is characterized by a formation to shorten a time occupied by normal idle signals in the optical signals for data communication under situation that it is difficult to alter the signal pattern of the normal idle signals in by reason of ensuring the connectivity with a conventional device. By this formation, a frequency component of a modulation waveform of the optical signals for data communication is dispersed to avoid a concentration on a specific frequency.

Figure 8:
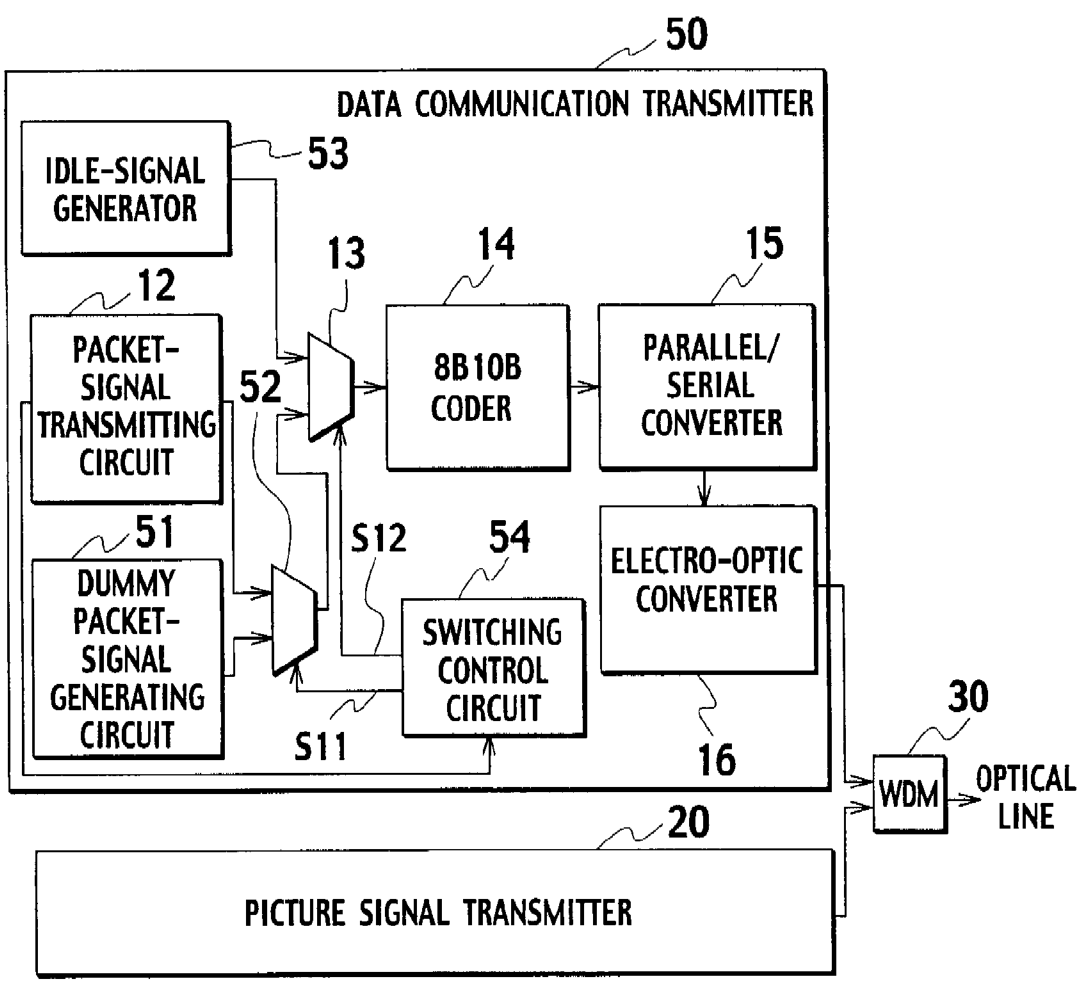
FIG. 8 is a block diagram showing a constitution of an optical communications system having a data communication transmitter in accordance with a second embodiment.

FIG. 8 is a block diagram showing a constitution of an optical communication system having an optical communication device in accordance with the second embodiment of the present invention. Elements in common with those of FIG. 4 are indicated with the same reference numerals respectively and their explanations are eliminated.

Figure 1:
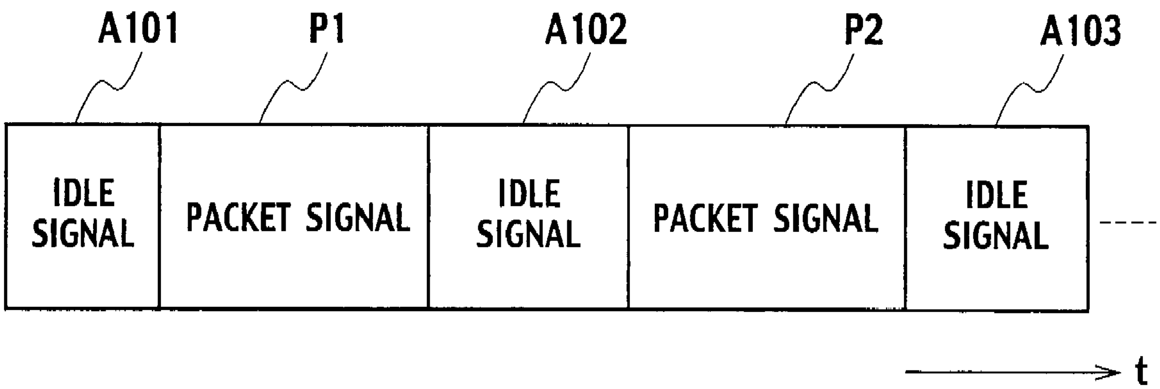
FIG. 1 is a pattern diagram showing the contents of optical signals in a data communication in prior art.
Figure 2:
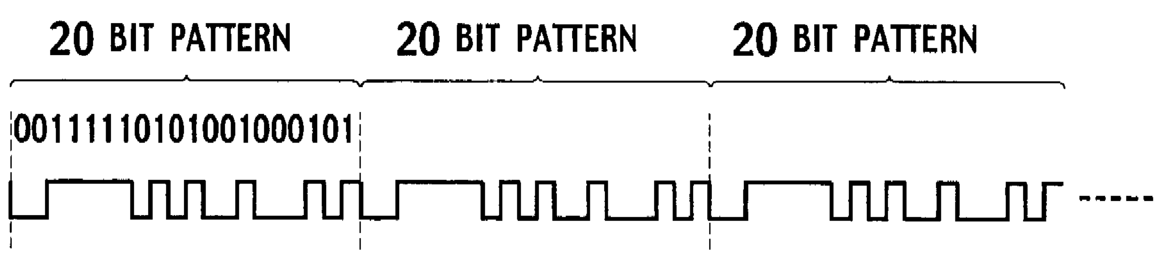
FIG. 2 is a waveform chart showing modulation waveforms of idle signals in prior art.

The optical communication system of this embodiment differs from the first embodiment in the constitution of a data communication transmitter 50. That is, the data communication transmitter 50 is equivalent to the constitution of the data communication transmitter 10 plus a dummy packet-signal generating circuit (dummy packet-signal generator) 51 for generating e.g. dummy packet signals consisting of the cyclic signal pattern having the cycle of 160 bit-string shown in FIG. 5 and further a selector 52 for selecting either outputs of the packet signal transmitting circuit 12 or outputs of the dummy packet-signal generating circuit 51. Additionally, a switching control circuit 54 outputs switching control signals S11, S12 to the selector 52 and the selector 13, respectively. Further, in this embodiment, the device includes an idle signal generator 53 which generates normal idle signals (see FIG. 2) and which corresponds to the 8-bit counter 11 of the first embodiment. The selector 13 is constructed so as to select either outputs of the idle signal generator 53 or outputs of the selector 52. Again, the device of this embodiment includes the idle signal generator 53 corresponding to the 8-bit counter 11 of the first embodiment.

According to the data communication transmitter 50 constructed above, the switching control circuit 54 receives a signal from the packet signal transmitting circuit 12, further judges the presence or absence of a packet signal transmitted from the packet signal transmitting circuit 12 and outputs a switching control signal S11 to allow the selector 13 to select an output from the packet signal transmitting circuit 12 while the packet signal is transmitted from the packet signal transmitting circuit 12. On the other hand, the switching control circuit 54 outputs a switching control signal S11 to allow the selector 52 to select an output from the dummy packet-signal generating circuit 51 in a constant time zone during that period when the packet signal is not transmitted from the packet signal transmitting circuit 12. At this time, as described in the first embodiment, the outputs from the dummy packet-signal generating circuit 51 are converted to dummy packet signals DP1, DP2, . . . consisting of the cyclic signal pattern having the cycle of 160 bit-string by the 8B10B coder 14.

Additionally, the switching control circuit 54 outputs a switching control signal S12 to allow the selector 13 to select an output of the idle-signal generator 53 only during that period when the packet signal and the dummy packet-signal are not outputted from the selector 52.

Figure 9:
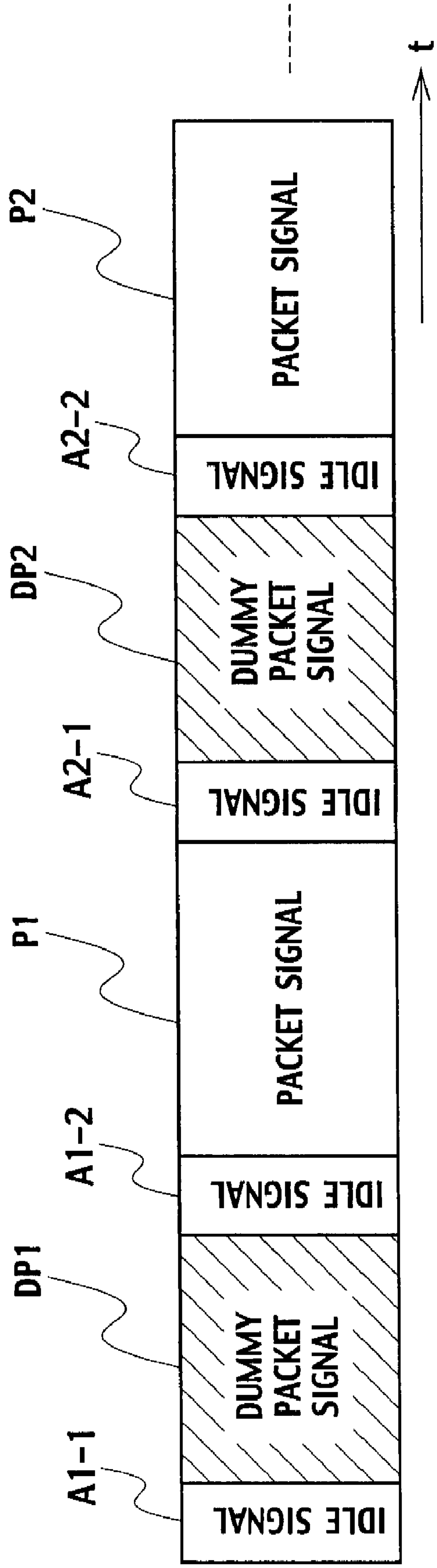
FIG. 9 is a pattern diagram showing the contents of optical signals outputted from the data communication transmitter in accordance with the second embodiment.

Consequently, as shown in FIG. 9, the optical signals for data communication transmitted from the data communication transmitter 50 have a format where dummy packet signals DP1, DP2, . . . consisting of the cyclic signal pattern having the cycle of 160 bit-string are inserted into periods that the packet signals P1, P2 are absent and furthermore, normal idle signals A1-1, A1-2, A2-1, A2-2 are embedded both in front and in the rear of these dummy packet signals DP1, DP2, . . . , respectively.

In the optical signals for data communication, thus, by inserting the dummy packet signals DP1, DP2, . . . consisting of the cyclic signal pattern having the cycle of 160 bit-string into the periods that the packet signals P1, P2 are absent, it is possible to disperse the frequency component of the modulation waveform in the periods to insert the dummy packet signals. Further, since a time occupied by the normal idle signal is shortened, it is also possible to avoid a concentration of the frequency component of the idle signal on a specific frequency.

Consequently, as similar to the first embodiment, a baneful influence of the induced Raman scattering, which is caused by the optical signals for data communication transmitted from the data communication transmitter 50, on the optical signals for picture communication transmitted from the picture signal transmitter 20 is reduced to allow the quality of the relevant optical signals for picture communication to be maintained favorably.

Note that the content of a dummy packet signal is not limited to the cyclic signal pattern having the cycle of 160 bit-string shown in FIG. 5 so long as it is possible to disperse a frequency component of a modulation waveform of the signal pattern. In this embodiment, since the alteration of the content of the dummy packet signal inserted between the original packet signals allows the frequency component of the modulation waveform of the optical signals in data communication to disperse, the baneful influence of stimulated Raman dispersion could be reduced even if it is hard to alter the signal pattern of the idle signal, allowing the optical communication to be improved in its quality.

Further, by techniques, such as (1) transmitting the dummy packet signal in the form of a packet signal which is shorter than a prescribed packet length and (2) making a nonexistent destination display (address etc.) of the packet signal, a receiving end could dispose the dummy packet signal as invalid data.

INDUSTRIAL APPLICABILITY

According to the present invention, in the optical fiber communication of WDM method, it is possible to reduce a baneful influence of the induced Raman scattering by optical signals for data communication on optical signals for picture communication, improving the quality of picture optical communication in a low price.

Additionally, with the embodiment using the dummy packet signal, it is possible to ensure the connectivity with an existing device.

The invention claimed is:

1. An optical communications device for generating optical signals for data communication, the generated optical signals having a wavelength, which is shorter than a wavelength of optical signals for video signal communication, and which is adjacent to the wavelength of the optical signals for video signal communication, the optical communications device comprising:

- a packet-signal generator that generates packet signals as the optical signals for data communication;
- a dummy packet-signal generator that generates dummy packet signals to be inserted between the packet signals generated by the packet-signal generator;
- an idle-signal generator that generates idle signals to be inserted between a packet signal generated by the packet-signal generator and a dummy packet signal generated by the dummy packet-signal generator; and
- a switching controller that causes a dummy-packet signal generated by the dummy packet-signal generator and an idle signal generated by the idle-signal generator to be alternately transmitted,
- wherein the dummy packet-signal generator generates a dummy packet as a signal having a period longer than that of an idle signal generated by the idle-signal generator.

2. The optical communications device of claim 1, wherein the dummy packet signal is a packet whose length is shorter than a predetermined length of the packet signals.

3. The optical communications device of claim 1, wherein the dummy packet signal has destination information established to be invalidation information.

4. An optical communications system comprising:

- an optical communications device comprising:
  - a packet-signal generator that generates packet signals as optical signals for data communication;
  - a dummy packet-signal generator that generates dummy packet signals to be inserted between the packet signals generated by the packet-signal generator;
  - an idle-signal generator that generates idle signals to be inserted between a packet signal generated by the packet-signal generator and a dummy packet signal generated by the dummy packet-signal generator;
  - a switching controller that causes a dummy-packet signal generated by the dummy packet-signal generator and an idle signal generated by the idle-signal generator to be alternately transmitted; and
  - a video signal generator that generates optical signals for video signal communication, the generated optical signals having a wavelength, which is longer than a wavelength of the optical signals for data communication, and which is adjacent to the wavelength of the optical signals for data communication; and
- a wavelength division multiplexing device that multiplexes the optical signals for data communication and the optical signals for video signal communication by wavelength division multiplexing and transmits the optical signals to an optical circuit,
- wherein the dummy packet-signal generator generates a dummy packet signal as a signal having a period longer than that of an idle signal generated by the idle-signal generator.

* * * * *